(12) United States Patent
Wiebe

(10) Patent No.: US 7,083,116 B2
(45) Date of Patent: Aug. 1, 2006

(54) BOOM ARRANGEMENT FOR A CAR WASH

(76) Inventor: Jacob R. Wiebe, 60 Heaton Avenue, Winnipeg, Manitoba (CA) R3B 3E3

( * ) Notice: Subject to any disclaimer, the term of this patent is extended or adjusted under 35 U.S.C. 154(b) by 309 days.

(21) Appl. No.: 10/673,552

(22) Filed: Sep. 30, 2003

(65) Prior Publication Data

US 2005/0067513 A1    Mar. 31, 2005

(51) Int. Cl.
B05B 15/06    (2006.01)

(52) U.S. Cl. ............... 239/209; 239/750; 239/752; 15/DIG. 2; 248/75

(58) Field of Classification Search ........... 239/209, 239/750, 751, 752; 15/51.1, 51.3, 97.3, DIG. 2; 248/75
See application file for complete search history.

(56) References Cited

U.S. PATENT DOCUMENTS

| | | | | |
|---|---|---|---|---|
| 2,011,375 A | * | 8/1935 | Rohan | 239/209 |
| 3,265,087 A | * | 8/1966 | Livingston | 137/560 |
| 4,131,132 A | | 12/1978 | Zierden | |
| 4,456,177 A | | 6/1984 | Johnson | |
| 4,575,005 A | * | 3/1986 | Wiebe | 239/195 |
| 4,998,693 A | | 3/1991 | Wiebe | |
| 5,620,157 A | | 4/1997 | Titzer | |
| 6,135,363 A | | 10/2000 | Titzer | |

* cited by examiner

Primary Examiner—Dinh Q. Nguyen
(74) Attorney, Agent, or Firm—Adrian D. Battison; Michael R. Williams; Ryan W. Dupuis

(57) ABSTRACT

A double boom arrangement for use in a car wash includes a first and a second boom assembly mounted side by side on a respective rotatable coupling so that a horizontal portion of the hose of each boom can rotate about a vertical axis in a generally horizontal plane with the remainder of the hose extending downwardly from the horizontal plane at an outer end of the boom. Each boom has a parking arrangement for moving the boom and the hose to a parked location extending 180 degree away from the other boom. The boom includes a first inner and a second outer boom portion with the inner and outer portions connected by a second swivel coupling parallel to the first and spaced outwardly therefrom. The inner boom portion is mounted on a bracket for pivotal movement about a horizontal axis and constrained by two horizontal springs above the pivot axis. The springs are mounted at opposite ends of a rod bent around the pivot axis where each is compressed as the first boom portion pivots downwardly. The second boom portion uses a spring wire support to provide a second pivot action.

10 Claims, 5 Drawing Sheets

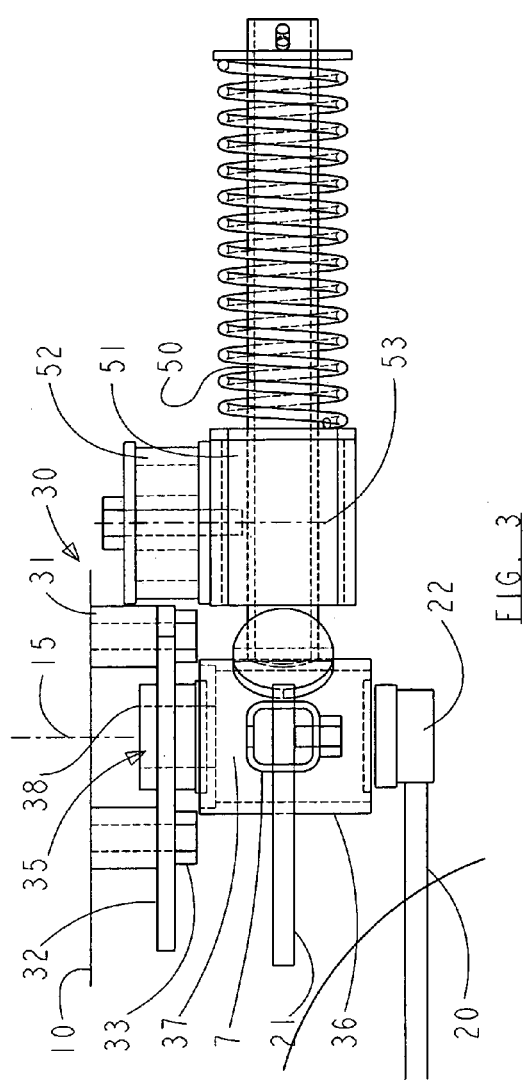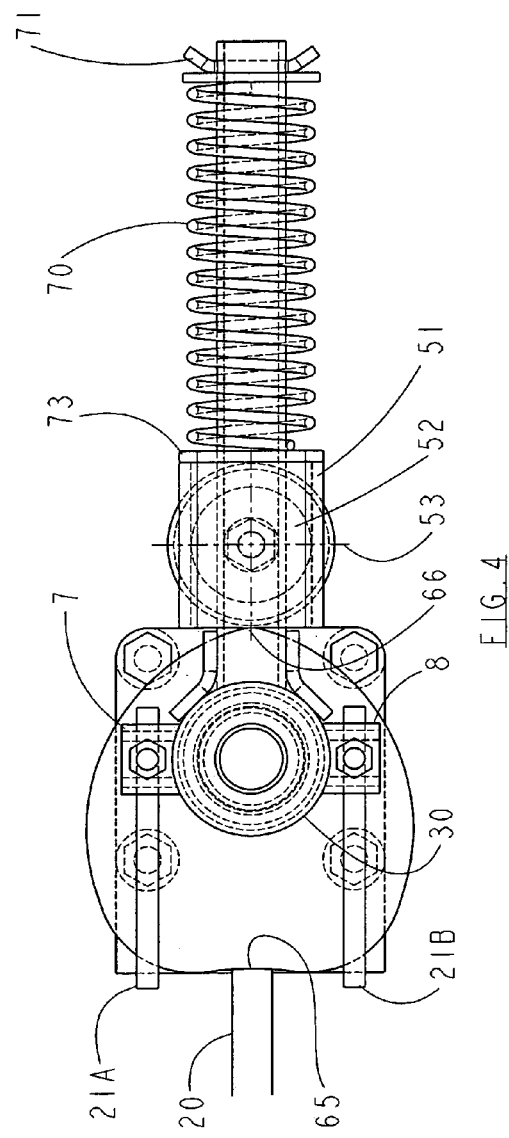

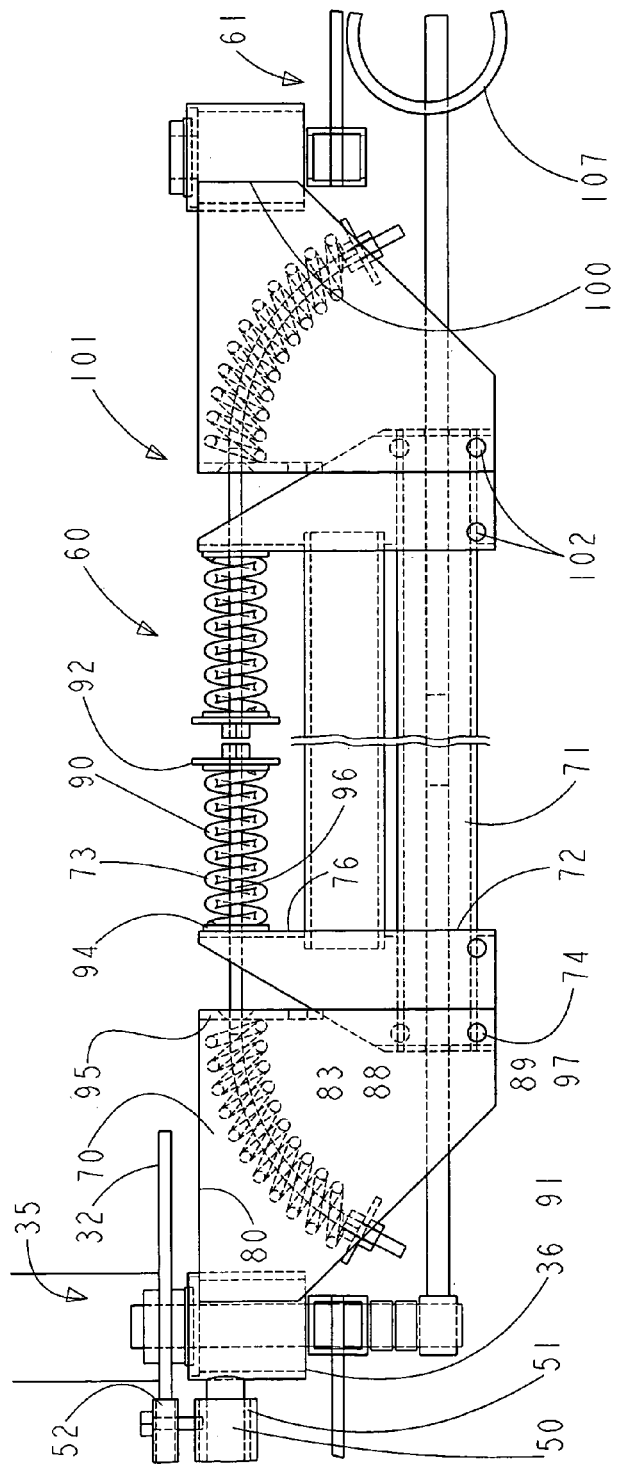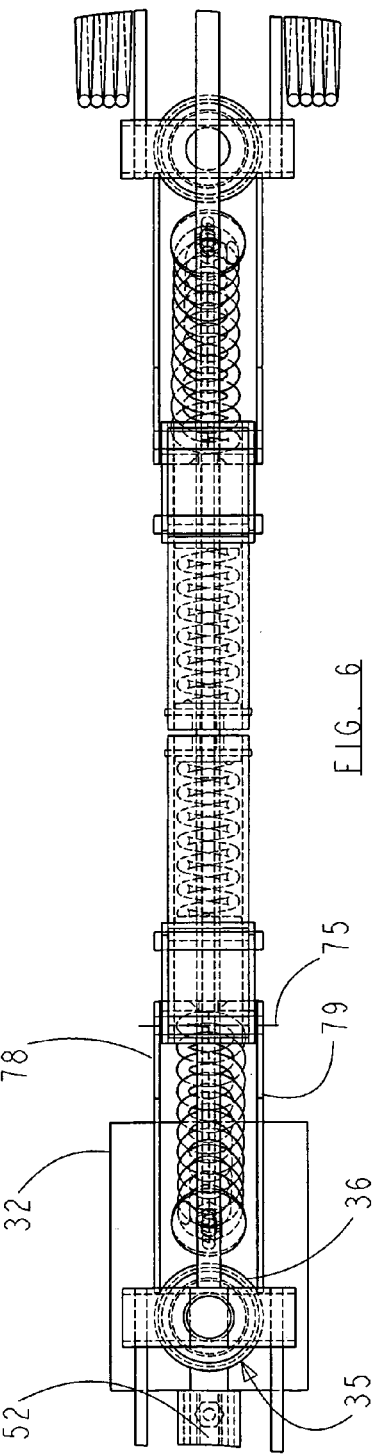

BOOM ARRANGEMENT FOR A CAR WASH

This invention relates to a boom arrangement for a car wash in which a flexible hose extends from a washing liquid supply at the ceiling to a wash spray wand and there is provided a boom mounting the hose on a swivel at the ceiling allowing the hose on the boom to rotate in a horizontal plane at the ceiling.

BACKGROUND

In U.S. Pat. No. 4,575,005 issued Mar. 11, 1986, the present inventor provides a boom arrangement in which a hose is mounted on a swivel mount at the ceiling which rotates about a vertical axis and carries the hose in a generally horizontal plane on a spring support which allows the hose end spaced outwardly from the swivel mount to be pulled downwardly from the horizontal plane for use.

U.S. Pat. No. 4,456,177 issued Jun. 26, 1984 to Johnson shows a cam in a horizontal plane where the cam follow is spring biased against the outside surface of the cam and the cam has a shape which is generally circular with a cut off section along a chord of the circle which tends to move the boom to a parked position. This arrangement has no parking effect around a majority of the circle and a relatively low parking force to a specific park position.

U.S. Pat. No. 5,620,157 to Titzer issued 1997 shows a first arrangement of double boom in which one boom remains in a horizontal plane underneath the other boom and the other boom twists up and down so that it is raised in the park position and twists downwardly rather than sliding downwardly as it passes underneath the first boom. This requires two different mounting arrangements for the two booms and apparently this was found unsatisfactory.

Turning therefore to U.S. Pat. No. 6,135,363 issued Oct. 24, 2000 to Titzer, in FIGS. 2 and 3 there is disclosed a twisted cam arrangement so that as the boom rotates it also moves vertically upwardly and downwardly on the sliding shaft. This arrangement uses vertical springs which pull the boom upwardly to the raised position so that this will act to rotate the boom to the raised position acting as a park position in which the boom extends away from the other of the booms.

It is desirable therefore to provide a self parking boom arrangement which locates the boom and hose at one side of the bay to allow the vehicle to enter and leave without engaging the hose and to allow the boom to be used with a second boom so that one is parked while the other is in use and can pass the first to swivel to a required location unimpeded.

Boom arrangements of this type generally mount the boom in a horizontal plane so that the hose can hang downwardly from the outer end of the boom and can be operated by the user by swiveling the boom around its vertical axis. However in some cases there is a pulling action downwardly on the boom either by a vigorous pulling action by the user or by the hose becoming entrapped and pulled. If there is no resilience in the system, any such pulling action can cause damage and breakage commonly at the center swivel location which is relatively complicated and therefore relative expensive.

In U.S. Pat. No. 4,131,132 (Zierden) issued Dec. 26, 1978 is disclosed a boom of this general arrangement where the inner end of the boom is mounted on a channel shaped support and is mounted for pivotal movement about a transverse horizontal axis at the channel member on trunions. A U-shaped member engages over an innermost end of the boom beyond the trunions and carries compression springs which pull the U-shaped member downwardly to hold the innermost end horizontal. Downward pulling on the outer end of the boom therefore pulls the U-shape member upwardly. Two compression springs are mounted one on each at the legs of the U-shape member so that the legs and the springs extend downwardly below the channel member. The legs and springs are thus exposed below the system and thus must be relatively short since they would otherwise interfere with the clearance underneath the system.

In U.S. Pat. No. 4,998,693 of the present inventor is disclosed another arrangement for mounting the boom for a pivoting action downwardly from the nominally horizontal plane. This arrangement provides an inexpensive construction including one or a pair of spring wires which are looped around a horizontal axis to form a coil at the inner end and an outwardly extending portion connected to the coil. Downward pulling movement on the outwardly extending portion thus acts to torsion the coil.

Both of these arrangements have been relatively successful in the marketplace. The second arrangement provides an inexpensive simple construction. The first arrangement provides a more rugged more complex construction but has the disadvantage that the amount of movement is limited.

SUMMARY OF THE INVENTION

It is one object of the present invention, therefore, to provide an improved boom arrangement for a car wash.

According to one aspect of the invention there is provided boom arrangement for use in a car wash comprising:

a mounting member for attachment to a support;

a flexible hose for receiving a wash-spray device on one end of the hose and a water supply device at the other end of the hose, a boom for supporting a substantially horizontal portion of the hose, a rotatable coupling carried on the mounting member for supporting an inner end of the boom so that the horizontal portion of the hose can rotate about a vertical axis in a generally horizontal plane with the remainder of the hose extending downwardly from the horizontal plane at an outer end of the boom;

and a parking arrangement for moving the coupling, the boom and the hose to a parked location at a specific angular location around the vertical axis;

the parking arrangement comprising a cam and a cam follower, one of the cam and the cam follower being mounted on the mounting member and the other on the boom such that the cam follower moves relative to the cam as the boom rotates about the vertical axis;

the cam follower being spring biased into engagement with the cam so as to generate a force tending to rotate the boom about the vertical axis;

the cam being shaped so as to define a parked position of the boom in which the spring bias is at a minimum potential energy and a position remote from the parked position in which the spring bias is at a maximum potential energy;

and the cam being shaped so as to define a substantially constant gradient in both clockwise and counterclockwise directions around the axis from the remote position to the parked position so as to define a substantially constant parking force toward the parked position.

Preferably the remote position is spaced from the parked position by 180 degrees and the cam is symmetrical about a diameter joining the parked position and the remote position. This makes the cam generally heart shaped.

Preferably the parked position defines a notch in the cam and this is a consequence of the constant gradient.

Preferably the cam comprises a disk mounted in a horizontal plane and the cam follower engages an outer edge of the disk.

Preferably the cam follower is mounted on the rotatable coupling with the boom and the cam is mounted on the mounting member. However the cam may be rotatable with the boom and the follower fixed.

Preferably the rotatable coupling carries a slide arm on which the cam follower is mounted for sliding movement toward and away from the cam and wherein there is provided a pair of arms extending from the rotatable coupling generally at right angles to the slide arm each receiving a spring for biasing the cam follower toward the cam.

Preferably the cam follower includes a transverse bar parallel to the arms for connection thereto of the springs.

Preferably the boom comprises a pair of flexible wires and wherein each of the pair of arms carries a respective one of the flexible wires.

Preferably each of flexible wires extends from the rotatable coupling to an outer end of the horizontal portion of the hose and each includes a loop therein rotated through at least 360° arranged such that the wire can bend in a vertical bending plane down from the horizontal plane about an axis defined by said loop, said loop lying substantially in the vertical bending plane of the wire whereby bending of said wire in said vertical bending plane causes torsioning of the loop.

According to a second aspect of the invention there is provided a boom arrangement for use in a car wash comprising:

a first and a second boom assembly each comprising:

a mounting member for attachment to a support;

a flexible hose for receiving a wash-spray device on one end of the hose and a water supply device at the other end of the hose, a boom for supporting a substantially horizontal portion of the hose, a rotatable coupling carried on the mounting member for supporting an inner end of the boom so that the horizontal portion of the hose can rotate about a vertical axis in a generally horizontal plane with the remainder of the hose extending downwardly from the horizontal plane at an outer end of the boom;

and a parking arrangement for moving the coupling, the boom and the hose to a parked location at a specific angular location around the vertical axis;

the boom assemblies being arranged to be mounted side by side on the support with the mounting members thereof adjacent but spaced on the support such that each boom as it rotates passes underneath the mounting member of the other boom;

the parking arrangements of the boom assemblies being arranged such that in the specific angular location of the parking location of each boom assembly the boom thereof extends in a direction generally 180 degrees away from the other of the boom assemblies;

and the boom of each boom assembly being inclined downwardly and outwardly from its rotatable coupling to its outer end spaced outwardly from its rotatable coupling such that, with one of the booms in its parked position, the other of the booms can rotate around its vertical axis while passing underneath said one boom.

Preferably the parking position of each boom assembly lies directly on a line joining the vertical axes of the boom assemblies, but in generally provided it extends generally away from the other boom, the booms can pass in view of the inline of the passing boom.

Preferably each boom includes a first sharply inclined section and a second more shallowly inclined section in which the boom is inclined downwardly and outwardly at a constant angle. The constant angle of incline ensures that the whole length of the passing boom is underneath the parked boom.

According to a third aspect of the invention there is provided a boom arrangement for use in a car wash comprising:

a mounting member for attachment to a support;

a flexible hose for receiving a wash-spray device on one end of the hose and a water supply device at the other end of the hose, a boom for supporting a substantially horizontal portion of the hose, a rotatable swivel coupling carried on the mounting member for supporting an inner end of the boom so that the horizontal portion of the hose can rotate about a vertical axis in a generally horizontal plane with the remainder of the hose extending downwardly from the horizontal plane at an outer end of the boom;

and a pivot coupling allowing pivotal movement of the boom about a generally horizontal axis transverse to the boom such that an outer end of the horizontal portion can pivot downwardly out of the horizontal plane when the hose is pulled, the pivot coupling comprising:

a bracket mounted on the rotatable coupling and extending outwardly from the vertical axis;

a pivot support at a bottom of the mounting bracket defining the horizontal axis;

a pivot member on the boom carried on the pivot support such that the boom can pivot about the horizontal axis;

the bracket defining an first spring receiving portion located substantially vertically above the pivot axis;

the pivot member including a second spring receiving portion for cooperation with the first string receiving portion;

and a compression spring carried on a support rod connected between the first and second spring receiving portions such that pivotal movement of the pivot member relative to the bracket acts to compress the spring.

Preferably the rod projects through both the first and second receiving portions and there is provided a second spring such that one spring is located between the first receiving portion and the end of the rod and a second spring is located between the second receiving portion and the second end of the rod such that both springs are compressed as the pivot member pivots relative to the bracket.

Preferably at least a part of the rod is bent such that it follows generally an arc around the pivot axis.

Preferably the part of the rod extending from the second receiving portion to the second end of the rod is substantially straight and parallel to the boom such that it is substantially horizontal when the boom is in its substantially horizontal raised position.

Preferably there is provided an adjustable stop pin between the bracket and the pivot member attached to the boom.

Preferably the bracket is formed by two parallel vertical plates and the spring and rod are located between the plates.

Preferably there is only a single rod between the plates.

Preferably the pivot member includes two side plates parallel to the vertical plates of the bracket and a back plate at right angles to the side plates, the back plate having an opening therethrough which defines the second receiving portion.

Preferably the receiving portions are located at the top of the bracket which is substantially aligned with a top of the swivel coupling and wherein the pivot axis is located at a height below a bottom of the swivel coupling.

According to a fourth aspect of the invention there is provided a boom arrangement for use in a car wash comprising:

a mounting member for attachment to a support;

a flexible hose for receiving a wash-spray device on one end of the hose and a water supply device at the other end of the hose, a boom for supporting a substantially horizontal portion of the hose, a rotatable swivel coupling carried on the mounting member for supporting an inner end of the boom so that the horizontal portion of the hose can rotate about a vertical axis in a generally horizontal plane with the remainder of the hose extending downwardly from the horizontal plane at an outer end of the boom;

a pivot coupling allowing pivotal movement of the boom about a generally horizontal axis transverse to the boom such that an outer end of the horizontal portion can pivot downwardly out of the horizontal plane when the hose is pulled;

the boom including:

a first boom portion extending outwardly from the pivot coupling;

a second boom portion;

a second rotatable swivel coupling at an outer end of the first boom portion and connecting the second boom portion to the outer end of the first boom portion;

and a spring support connected to the second swivel coupling for providing spring support of the second boom portion allowing downward flexing movement of the second boom portion relative to the second swivel coupling.

Preferably the spring support comprises a pair of generally parallel spring wires, each of which includes a coil which is coiled around a generally horizontal axis and a position which extends from the coil generally horizontally therefrom.

BRIEF DESCRIPTION OF THE DRAWINGS

One embodiment of the invention will now be described in conjunction with the accompanying drawings in which:

FIG. 3 is a side elevational view of the mounting assembly of one of the booms of FIG. 1, showing the boom in the parked position.

FIG. 4 is a top plan view of the boom of FIG. 3, showing the boom in the position opposite to the parked position.

FIG. 5 is a side elevational view of a second embodiment of the boom having a compound boom construction.

FIG. 6 is a top plan view of the boom of FIG. 5, in simplified form for convenience of illustration.

In the drawings like characters of reference indicate corresponding parts in the different figures.

DETAILED DESCRIPTION

Figure 1:
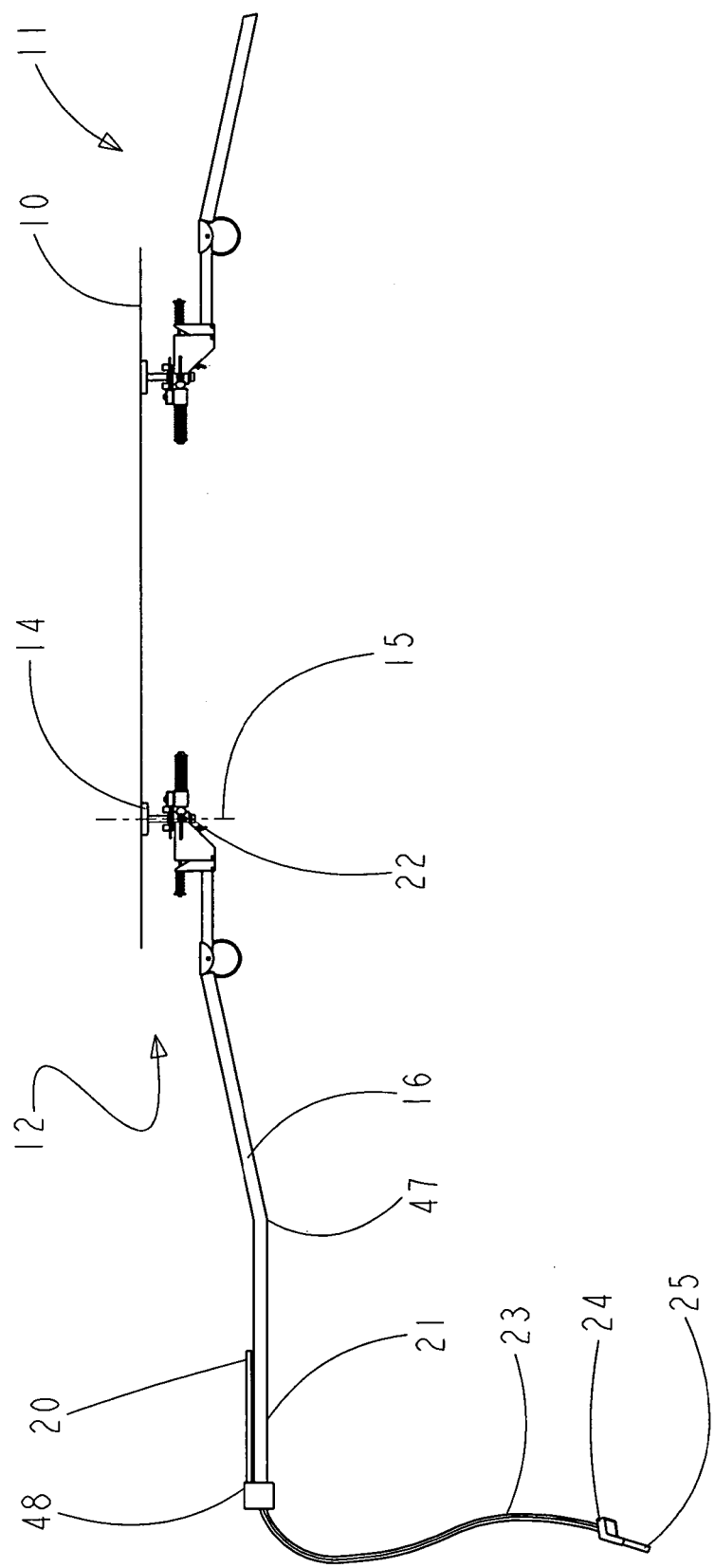
FIG. 1 is a cross sectional view through a boom assembly for a car wash according to the present invention in which there are two booms side by side, both shown in the parked position.

In FIG. 1 is shown a mounting surface 10 on which is mounted a pair of booms 11 and 12 shown schematically. Each boom assembly comprises a fixed mounting member 14 which defines a vertical pivot axis 15 about which a boom 16 can swivel in a generally horizontal plane.

Each of the booms is generally of the construction shown in the above U.S. Pat. No. 4,575,005 in that it includes a hose 20 mounted on a spring boom 21 so the hose extends from an inner swivel 22 in a generally horizontal plane to an outer end of the boom 21 from which the hose includes a depending end portion 23 which extends downwardly to a wand 24 and a spray nozzle 25 in a conventional manner.

Further details of a boom construction and swivel mounting for a car wash are disclosed in U.S. Pat. Nos. 4,998,693 and 6,070,917 of the present applicant, to which reference should be made for further details as required, bearing in mid the above disclosures and the knowledge of a person skilled in the art, the following description relates primarily to the construction of the boom itself.

As best shown in FIG. 3, the boom assembly comprises a mounting member 30 comprising a plurality of posts 31 and plate 32 attached by bolts 33 to the support surface 10 generally the ceiling of the bay within which the car wash is located. The plate 33 carries a swivel generally indicated at 35 which provides a support for a collar 36 carrying the boom 21 and a water supply duct 37 which has at its upper end a coupling 38 for connection to a supply at the ceiling 34 and at its lower end the coupling 22 for attachment to the hose 20. Thus the swivel provides a rotatable high pressure connection which allows the upper coupling 38 to be fixed relative to the supply and the lower coupling 22 to rotate around the vertical axis 15.

The sleeve 36 carries a pair of arms 7 and 8 each of which projects outwardly to a respective side of the sleeve 36 and each of which connects to and supports an inner end of a respective one of the flexible wires 21A and 21B forming the boom 21 in the same construction as in the above mentioned patent. Thus each of the wires 21A and 21B has an inner end clamped to the respective arm 7, 8. From the inner end, the flexible wire extends horizontally outwardly in a first portion 40 which forms a loop 41 having a plurality of turns defining a flex section allowing the wire to be pulled downwardly at its outer end while generally maintaining the wire in the horizontal plane thus supporting the outer end of the hose. An adjustment bracket 42 is provided at the loop 41 which operates, as described in the above patent, with an adjustment screw to adjust the height of the outer end of the wire relative to the inner end 40.

Each of the wires includes, as best shown in FIG. 1, a first downward and outwardly incline section 45 and a second horizontal or less inclined section 46 which extends from an inner end 47 of the second section 46 to the outer end 48 at the depending portion 23 of the hose 20. Thus the sharply inclined inner section 45 extends downwardly from the top of the loop 41 to a lower end at the inner end 47 which is below the height of the bottom edge of the loop 41. From that inner end 47, the second section 46 is horizontal or is inclined only slightly downwardly and outwardly to the outer end 48.

The sleeve 36 further carries a slide arm 50 which extends from the sleeve 36 in a horizontal direction opposite to the extent of the boom and therefore 90 degrees to the arms 7 and 8. The slide arm 50 carries a collar 51 which can thus slide inwardly and outwardly along the arm 50. The collar carries a cam follower roller 52 which is mounted on the top of the collar and thus lies in a horizontal plane with a vertical rotation axis 53.

The outside edge of the plate 32 defines a cam surface 60 in the form surrounding the axis 15 of the rotation of the boom. The cam plate 32 is thus fixed in the horizontal plane and fixed against rotation around the axis 15 so that it is held in fixed position for contacting the peripheral surface of the cam following roller 52.

The collar 51 is spring biased by a spring 70 onto the outside surface of the cam plate 32. Spring 70 extends from a plate 73 carried on the outer end of the collar 51 a plate 72 on an end of the slide rod 50. Thus the spring 70 surrounds the slide arm 50 and extends along the slide arm. The spring is a compression springs providing a significant force of the cam follower roller 52 onto the outside surface of the cam plate 32.

The cam is shaped as shown in FIG. 3 so that it has a minimum potential energy position 65 defining a parking location at a predetermined angular position around the axis 15. The cam also defines a position of maximum potential energy at a point 66 around its periphery which is diametrically opposite to the minimum position 65. Thus the cam is generally "heart" shaped with the maximum spacing from the axis 15 at the point 66 and the minimum spacing at the point 65. Between those two points, the outside surface of the cam is shaped so that there is a constant gradient leading from the point 66 to the point 65. Thus the rate of reduction of the radial distance from the axis 15 moving along the cam surface is constant. This generates a constant force tending to rotate the boom around the axis 15 towards the park position 65. The use of a constant force defined by the constant gradient of the cam shape ensures that whatever position the boom is released there is a constant force tending to move it back to the park position. This constant force therefore minimises the necessary spring biasing force required by the spring 70. Thus there is no tendency for the boom to stick at specific locations and it always moves back to the park position from whatever location it is released since it moves to one side or other of the location 66 depending upon which side of that location it starts.

As shown in FIG. 1, the booms are mounted side by side and spaced sufficiently so that there is clearance between the booms without interference or engagement between the slide arms 50 which project inwardly toward one another in the parked position as shown. Thus the booms are symmetrical and opposite and the park position lies on a line joining the axis 15 so that the booms extend in opposite directions in the parked position. Thus in a bay with the booms mounted at the ceiling, each hose can hang down along a respective side wall of the bay allowing the vehicle to drive inwardly and outwardly of the bay without interfering with the hoses.

One or other of the hoses can then be grasped by the user pulling the boom around its axis and thus pulling the boom out of its parked position to whatever location is required by the user.

Figure 2:
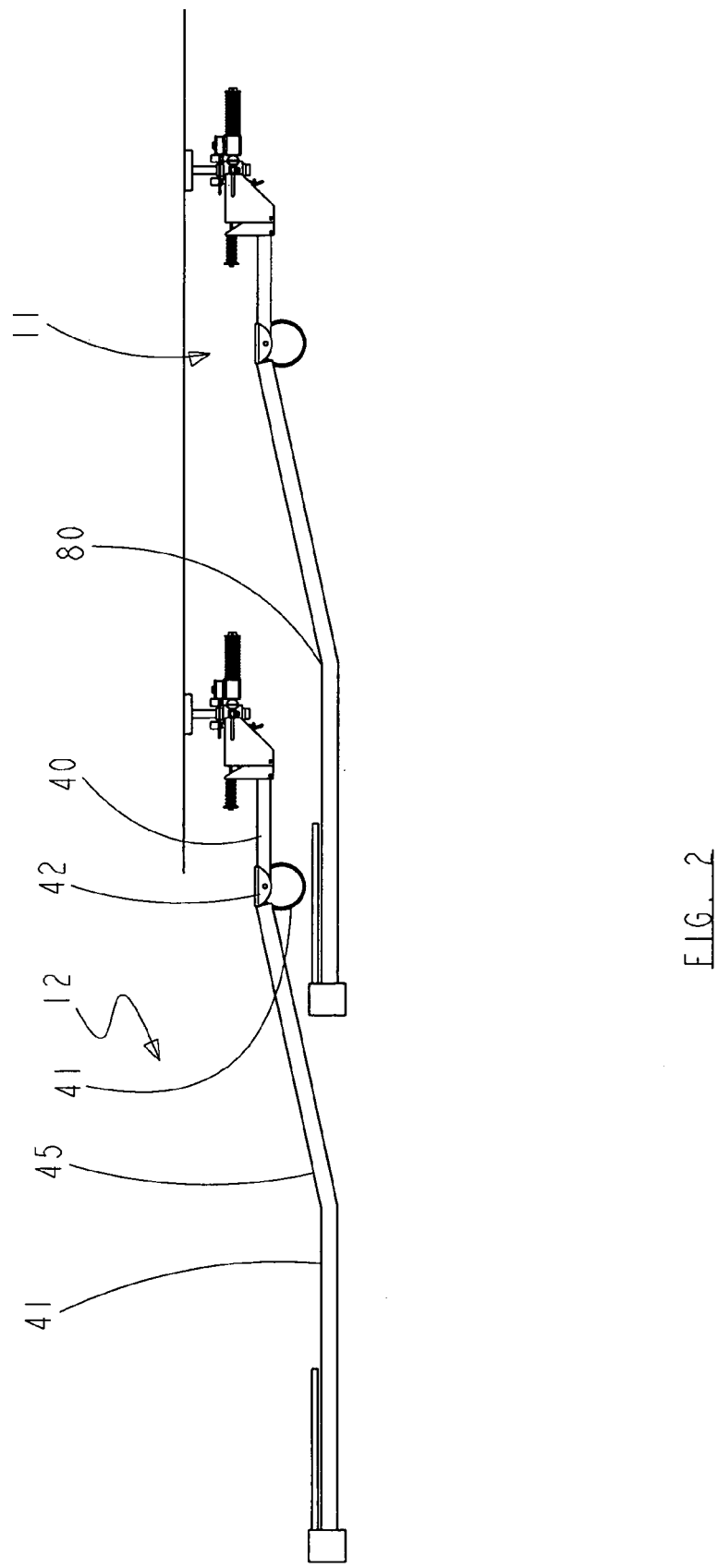
FIG. 2 is a cross sectional view similar to that of FIG. 1 showing one of the booms in the parked position and the other passing it in operation.
Figure 7:
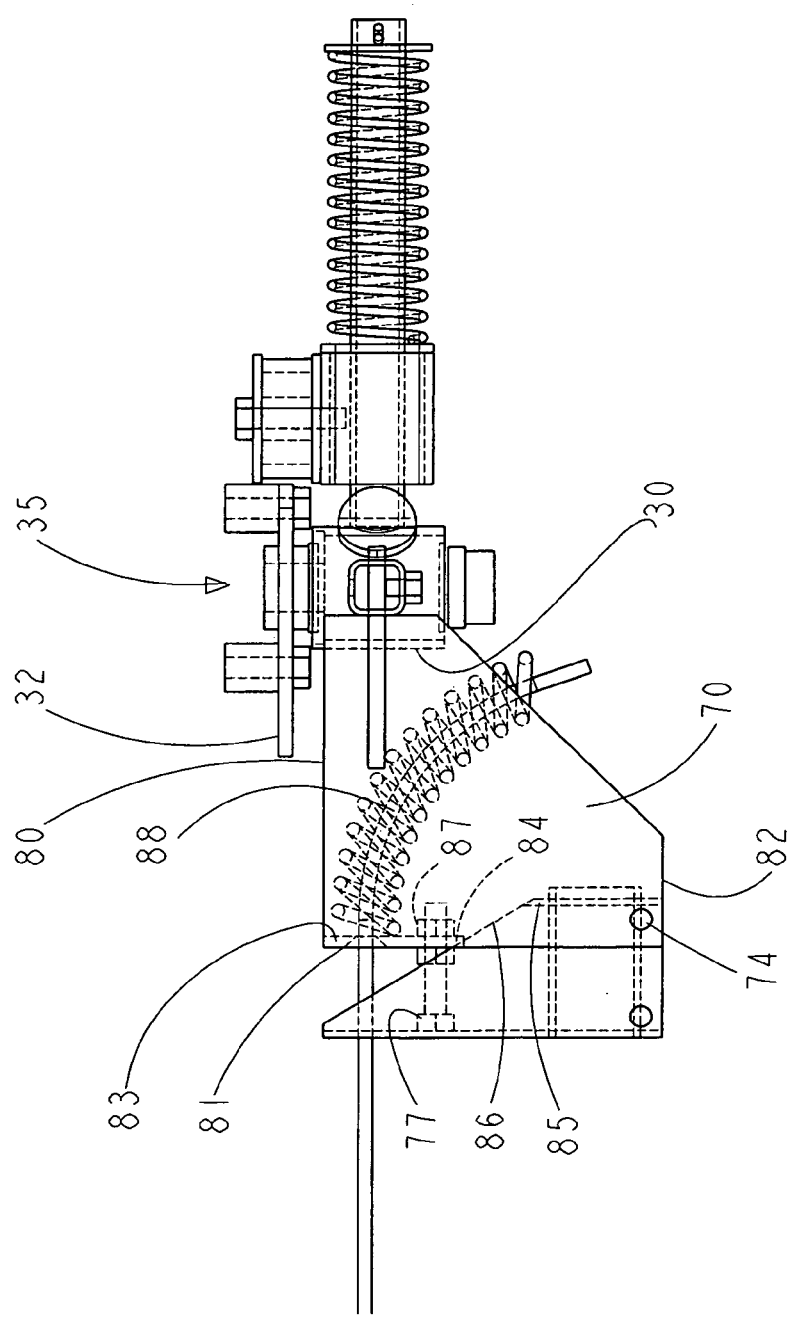
FIG. 7 is a side elevational view of the embodiment of FIG. 5 on an enlarged scale.

As shown in FIG. 2, the boom 11 which is in use can pass underneath the boom 12 which remains in its parked position. This ability to pass underneath the parked boom is obtained by the first sharply inclined section 45 which drops the flexible wires forming the boom and the hose carried thereby to a height underneath the spring coil 41 of the other boom. From that point the wires are horizontal or inclined only slightly outwardly and downwardly. Although the inner ends 47 of each of the booms are at the same height, the constant incline of both of the booms at the same angle ensures that the point 80 on the boom 11 which passes under the point 47 on the boom 12 is at a height below the point 47 because it is further out along the length of the boom which is inclined downwardly.

In this simple construction, therefore, both booms can operate independently with one remaining in the parked position until it is required whereupon the first when released moves directly to parked position allowing the first to be grasped and used.

The angle of inclination can be adjusted to ensure the proper passage of the booms by adjusting the bracket 42 as described in the above patent.

In FIGS. 5 and 6 is shown a modified embodiment using the same parking construction and layout as previously described but including a two part boom having a first inner part 60 and a second outer part 61 where the inner and outer parts are separated by a swivel coupling 62 which is spaced outwardly from and parallel to the main swivel mounting 35. Thus, in one embodiment of the present invention, the construction described herein after can be used in relation to a double boom of this type. However the same mounting of the inner boom element 60 on the swivel coupling 35 can be used in a single piece boom in which there is a single swivel member 35 supported a single boom arm 60 which extends to the outer end of the plane containing the hose so the end of the hose can be suspended downwardly from the outer end of the arm 60. However for convenience, the double boom arrangement will be described hereinafter.

In this embodiment the sleeve 36 carries a bracket 70 mounting the inner boom section 60. The inner boom section 60 includes a channel member 71 within which the hose 19 is draped so as to be supported thereby. The channel 71 is attached at its inner end to a rectangular tube member 72. The channel member is thus inserted into an opening at the back of the tube 72 and is attached thereto so as to stand outwardly in a horizontal direction at right angles to the vertical tube 72. The tube 72 provides a structural member for attachment to the bracket 70 and for supporting a biasing spring 73. The boom structure including the tube 72 and the channel 71 receives a transverse pivot pin 74 carried on the bracket 70 so as to define a horizontal pivot axis 75 lying transverse to the boom allowing the boom to pivot upwardly and downwardly about the axis 75. The spring 73 acts to bias the boom into the raised position in which the boom lies in a horizontal plane at which position a suitable adjustable stop 77 holds the tube 72 in place.

The swivel coupling 35 includes the bracket 70 which is defined by a pair of parallel plates 78 and 79. The plates 78 and 79 have a horizontal top edge 80 generally arranged at the top of the swivel sleeve 36 and extending therefrom outwardly to an outer edge 81. The outer edge 81 extends downwardly to a position just forward of the pivot pin 74 to a bottom edge 82 spaced below the bottom of the sleeve 36 and below the hose coupling 22. Thus the pivot pin 74 is below the hose 20 and the horizontal section thereof.

Between the plates 78 and 79 is connected a first transverse abutment plate 83 adjacent to but spaced rearwardly from the front edge 81. The abutment plate 83 is relatively short so that it extends only from the top edge 80 downwardly to a bottom edge 84 spaced upwardly from the pivot pin 74. The tube 72 includes a front wall 85 which is formed by cutting the tube at a chamfered edge 86 so that the top edge of the front wall 85 is below the bottom edge 84 to avoid any possibility of interference.

In the raised position of the boom, therefore, the rear wall 86 of the tube 72 abuts the stop 77 which is formed as a bolt engaged through a threaded opening in the plate 83 and locked in place by a lock nut 87.

The spring 73 includes a rod 88 and two spring elements 89 and 90. At the ends of the rod 38 are provided abutment plates 91 and 92 respectively which locate the ends of the springs 89 and 90 respectively. The abutment plates are attached to the ends of the rod by a suitable connection such as a threaded bolt thus holding the plates 91 and 92 and therefore the ends of the springs in fixed position at the ends of the rod.

The rod passes through the hole 94 in the wall 76 of the tube 72 thus confining the spring section 89 between the plate 91 and the wall 76. The rod 88 also passes through a hole 95 in the plate 83, thus confining the spring section between the plate 92 and the plate 83. The rod 88 includes a first straight section 96 which extends from the end of the plate 91 through the wall 76. The rod also includes a curved section 97 which is shaped so that it is generally arcuate around the axis 25 of the pin 74. As shown in FIG. 1, the rod portion 97 is smoothly curved from the plate 81 through to the plate 92 but it will be appreciated that an accurate smooth curvature is not essential to the operation of the device.

It will be appreciated that the pivotal movement of the boom caused by pulling downwardly on the inner portion 60 acts to compress the spring sections 89 and 90 by increasing the distance between the plate 83 and the wall 76. The section of the spring extending forwardly from the wall 76 is straight and is confined by the straight rod so that it is simply compressed in a straight manner with the rod sliding straight through the hole 94. However the curved section of the rod as it passes through the plate 83 follows around the axis 75 of the pin 74 thus maintaining the plate 83 generally at right angles to the rod at all points along the length of the rod as it passes through the hole 95. This avoids distortion of the system and bending of the spring section 90 and also maintains the spring wholly below the top edge 80 that is spaced well away from the plate 32 and the ceiling 10 to which it is attached.

The use of a rod which extends both forwardly and from the wall 76 and rearwardly from the plate 83 allows the use of two springs thus increasing the spring force applied to keep the boom in the raised position without the necessity of providing two parallel springs side by side. The two springs are located within the bounds defined by the plates 78 and 79 of the bracket 70 so that the springs are narrower than the sleeve 74 thus keeping the system simple, elegant and attractive in appearance.

In the double boom arrangement shown in FIG. 5, the second swivel coupling 62 comprises a sleeve 100 which is attached to the outer end 101 of the channel 71. The outer end 101 as shown includes a second pivot coupling similar to that at the bracket 70 and arranged to provide pivotal movement about a horizontal axis 102. The sleeve 100 may contain a water supply duct and a coupling similar to that of the main coupling 35.

The swivel coupling 62 is similar or identical to construction shown in the above U.S. Pat. No. 4,998,693 of the present applicant and acts therefore as a swivel coupling and a further spring section coupling including springs 107. Thus the springs 107 are the type disclosed in the above patent and include a spring wire bent to form an inner straight section connected to the swivel coupling, an outer straight section and a coiled section. The coil thus is coiled around an axis transverse to the boom and extending horizontally so that downward twisting movement on the outer straight section caused by pulling downwardly on the outer end of the hose acts to torsion the coiled section and allow the outer section to pivot downwardly without overstressing the spring wire from which the springs are formed. An adjustment cradling member is connected at the coil section to adjust the orientation of the outer straight section so that it is maintained in the horizontal plane as required.

The two section boom therefore can swivel at the two locations allowing the compound boom to articulate. The inner section can thus extend outwardly from the main center swivel at a first direction and the outer section can swivel around that position. Where the inner and outer boom sections are aligned, it will be appreciated that this is an uncommon occurrence and the boom sections can take up any position as required as controlled by the operator pulling on the end of the hose. Spring action of the two sections of the boom include the first relatively light spring action provided by the coiled sections of the springs 107 together with the stiffer and more resistant spring action of the spring 73. Thus the outer coil wire spring action can provide an initial light flexing for the operator pulling gently on the end of the hose whereas the inner spring 73 can act as a safety spring in the event that excess force is applied due to some entrapment of the hose or other potentially damaging situation.

As previously explained, the boom can be formed in the single in which the spring 73 acts to provide the spring action for the gentle pulling and also a more vigorous spring action providing significant pivotal movement to accommodate potentially damaging situations.

The design shown and described above thus provides the following features and advantages.

1. The curved section 97 of the rod ensures that the rod and the spring remain below the top edge of the bracket, regardless of the angle of movement of the boom around the pivot 74 so as to avoid interference of the spring with the ceiling or elements above the bracket.

2. The fact that the rod extends through both sides of the plates 76 and 83 allows the use of two springs one on each end with both of those springs providing spring force. Thus in a narrow arrangement a double spring force can be provided without the necessity for two parallel side by side springs.

3. The straight portion of the rod which lies parallel to the boom stays parallel to the boom during the movement of the boom around the pivot 74 so that the portion 96 of the rod can be relatively long allowing the use of a long spring.

4. The geometry including the relatively long springs and the two portions of rod allows a large angle of movement around the pivot 74 even as much as 90 degrees allowing the boom to be pulled down to a vertical position to avoid damage.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A boom arrangement for use in a car wash comprising:
   a mounting member for fixed attachment to a support;
   a flexible hose for receiving a wash-spray device on one end of the hose and a water supply device at the other end of the hose,
   a boom for supporting a substantially horizontal portion of the hose, a rotatable coupling carried on the fixed mounting member for supporting an inner end of the boom so that the horizontal portion of the hose can rotate about a vertical axis in a generally horizontal plane with the remainder of the hose extending downwardly from the horizontal plane at an outer end of the boom;

and a parking arrangement for moving the coupling, the boom and the hose to a parked location at a specific angular location around the vertical axis;

the parking arrangement comprising a cam and a cam follower, one of the cam and the cam follower being mounted on the mounting member and the other on the boom such that the cam follower moves relative to the cam as the boom rotates about the vertical axis;

the cam follower being spring biased into engagement with the cam so as to generate a force tending to rotate the boom about the vertical axis;

the cam being shaped so as to define a parked position of the boom in which the spring bias is at a minimum potential energy and a position remote from the parked position in which the spring bias is at a maximum potential energy;

and the cam being shaped so as to define a substantially constant gradient in both clockwise and counterclockwise directions around the axis from the remote position to the parked position so as to define a substantially constant parking force toward the parked position.

2. The boom arrangement according to claim 1 wherein the remote position is spaced from the parked position by 180 degrees and the cam is symmetrical about a diameter joining the parked position and the remote position.

3. The boom arrangement according to claim 1 wherein the parked position defines a notch in the cam.

4. The boom arrangement according to claim 1 wherein the cam comprises a disk mounted in a horizontal plane and the cam follower engages an outer edge of the disk.

5. The boom arrangement according to claim 1 wherein the cam follower is mounted on the rotatable coupling with the boom and the cam is mounted on the mounting member.

6. The boom arrangement according to claim 1 wherein the rotatable coupling carries a slide arm on which the cam follower is mounted for sliding movement toward and away from the cam and wherein there is provided a spring surrounding the slide arm for biasing the cam follower toward the cam.

7. The boom arrangement according to claim 1 wherein the boom includes a pair of flexible wires each of which includes a loop therein rotated through at least 360° arranged such that the wire can bend in a vertical bending plane down from the horizontal plane about an axis defined by said loop, said loop lying substantially in the vertical bending plane of the wire whereby bending of said wire in said vertical bending plane causes torsioning of the loop.

8. A boom arrangement for use in a car wash comprising:
a first and a second boom assembly each comprising:
   a mounting member for attachment to a support;
   a flexible hose for receiving a wash-spray device on one end of the hose and a water supply device at the other end of the hose,
   a boom for supporting a substantially horizontal portion of the hose,
   a rotatable coupling carried on the mounting member for supporting an inner end of the boom so that the horizontal portion of the hose can rotate about a vertical axis in a generally horizontal plane with the remainder of the hose extending downwardly from the horizontal plane at an outer end of the boom;
   and a parking arrangement for moving the coupling, the boom and the hose to a parked location at a specific angular location around the vertical axis;
the boom assemblies being arranged to be mounted side by side on the support with the mounting members thereof adjacent but spaced on the support such that each boom as it rotates passes underneath the mounting member of the other boom;
the parking arrangements of the boom assemblies being arranged such that in the specific angular location of the parking location of each boom assembly the boom thereof extends in a direction generally 180 degrees away from the other of the boom assemblies;
and the boom of each boom assembly being inclined downwardly and outwardly from its rotatable coupling to its outer end spaced outwardly from its rotatable coupling such that, with one of the booms in its parked position, the other of the booms can rotate around its vertical axis while passing underneath said one boom.

9. The boom arrangement according to claim 8 wherein the parking position of each boom assembly lies on a line joining the vertical axes of the boom assemblies.

10. The boom arrangement according to claim 8 wherein each boom includes a first sharply inclined section and a second more shallowly inclined section in which the boom is inclined downwardly and outwardly at a constant angle.

* * * * *